United States Patent [19]

Noso

[11] 4,249,356
[45] Feb. 10, 1981

[54] MOULDING CLIP DEVICES FOR ADHESIVELY ATTACHED WINDSHIELD STRUCTURES

[75] Inventor: Shizuma Noso, Tokyo, Japan

[73] Assignee: Toyo Kogyo Co., Ltd., Hiroshima, Japan

[21] Appl. No.: 62,466

[22] Filed: Jul. 31, 1979

[30] Foreign Application Priority Data

Jul. 31, 1978 [JP] Japan ............... 53-105870[U]

[51] Int. Cl.³ .................................. E04B 1/62
[52] U.S. Cl. ................................ 52/717; 296/84 D
[58] Field of Search ............. 296/146, 84 R, 84 D; 52/208, 717, 408, 401, 716, 718

[56] References Cited

U.S. PATENT DOCUMENTS

| 3,720,030 | 3/1973 | Krodel | 52/717 X |
| 4,147,005 | 4/1979 | Meyer | 52/717 X |
| 4,147,006 | 4/1979 | Kruschwitz | 52/717 X |
| 4,170,855 | 10/1979 | Murray et al. | 52/717 X |

Primary Examiner—John P. Silverstrim
Assistant Examiner—Norman L. Stack
Attorney, Agent, or Firm—Fleit & Jacobson

[57] ABSTRACT

In an automobile windshield structure in which a windshield glass is adhesively attached to a body frame, a clip device for installing a moulding along the peripheral edge portion of the glass comprises first and second lip members. The first clip member is adapted to be attached to the peripheral edge of the glass and has guide channels for slidably receiving cooperating slide portions in the second clip member. The first clip member has a retaining pawl which is adapted to engage with indentations on the second clip member so that the second clip member is prevented from moving in one direction with respect to the first clip member but movable in the opposite direction.

9 Claims, 9 Drawing Figures

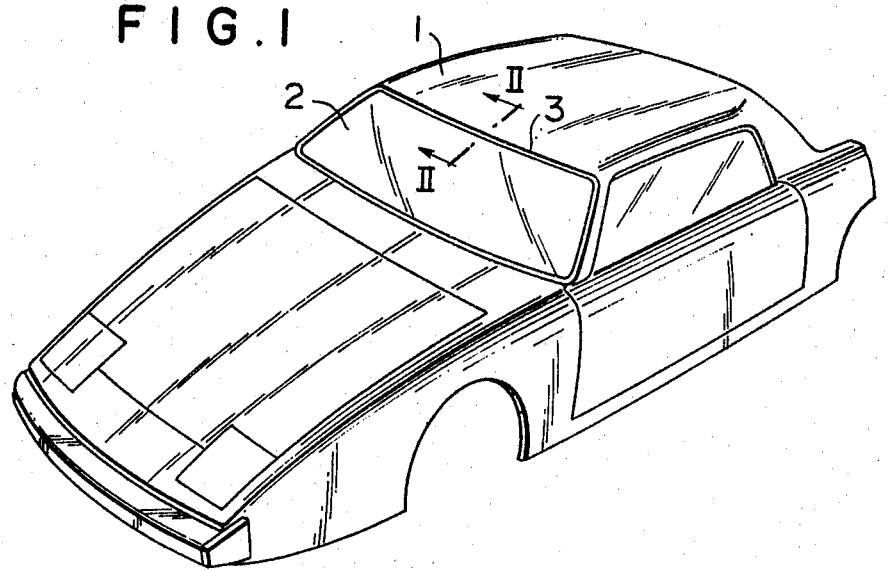
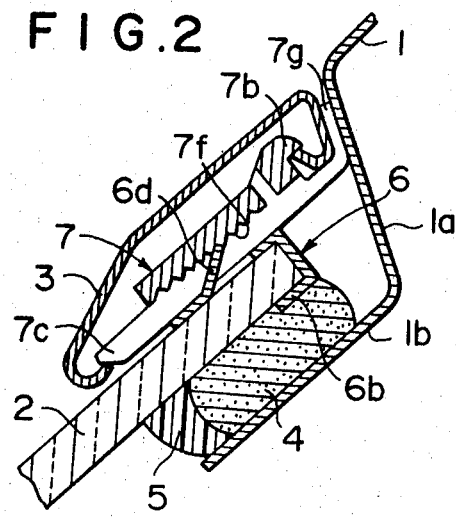
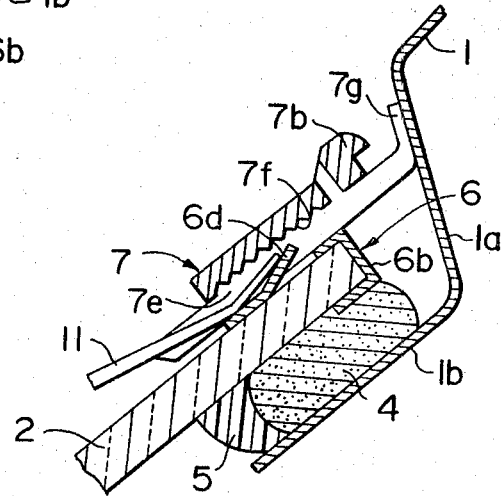

MOULDING CLIP DEVICES FOR ADHESIVELY ATTACHED WINDSHIELD STRUCTURES

The present invention relates to clip devices for installing moulding around adhesively attached automobile windshield glasses.

In conventional automobiles in which windshield glasses are attached to automobile frames through adhesives, the peripheries of the windshield glasses are covered by mouldings which are installed to the frames or to the glasses by means of moulding clips. Conventionally, such moulding clips are attached to the automobile frames through headed studs which are welded to the frames. Such conventional structure is disadvantageous in that expensive equipments and time are required for welding the studs. Further, it has often been experienced that corrosion is produced at the stud welding area. It should further be pointed out that the coating on the frame is often removed by being scratched when the moulding is installed and causes corrosions when water is applied to such scratched portions.

In view of the aforementioned problems, there has been proposed to attach clips to the windshield glass and install mouldings directly or through further clips to the first mentioned clips. However, such clips have not been satisfactory from the viewpoint of enabling ready adjustments of moulding positions. Further, such proposed structures have not been suitable for ready installation and removal while providing an adequate retaining force without having any problem of corrosion.

It is therefore an object of the present invention to provide a moulding clip device for an adhesively attached window, which is convenient for installation and removal and can provide an adequate retaining force.

Another object of the present invention is to provide a moulding clip device which does not cause any corrosion around the moulding area.

According to the present invention, the above and other objects can be accomplished, in a windshield structure comprising a windshield glass adhesively attached to a body frame at a windshield opening thereof, by a clip device for installing a moulding along peripheral edge portion of the glass which comprises a first clip member having means for gripping the peripheral edge portion of the glass and guide channel means, and a second clip member having means for engaging the moulding and means for slidably engaging with said guide channel means in the first clip member, said first clip member being formed with resilient retaining means and said second clip member with indentation means engageable with said retaining means so as to constrain relative movement between the first and second clip members in one direction but allow relative movement in the opposite direction. By means of the clip device in accordance with the present invention, the moulding can be readily installed along the peripheral edge of the windshield glass. The first clip member is at first attached to the peripheral edge portion of the glass and the second clip member is then mounted on the first member by slidably engaging it with the guide channel means. Thereafter, the moulding is mounted on the second clip member and the moulding, with the second clip member, is moved in said opposite direction until the moulding or the second clip member is forced against a portion of the body frame.

The resilient retaining means may be in the form of a resilient pawl and the second clip member can be readily disengaged from the first clip member by deflecting the pawl. For effecting such disengagement, a screw driver or any other suitable tool may be used. The second clip member may be formed with tongue means which may be positioned between the moulding and the body frame portion when the moulding is forced against the body frame portion. Such arrangement is advantageous in that metal-to-metal contact can be avoided by forming the clip member with a non-metallic material such as a plastic material. It should therefore be understood that according to the present invention welding is not required for the installation of the moulding so that a durable paint coating can be provided even in the moulding area. Further, there is little risk that the coating on the body frame is removed during installation of the moulding. Thus, it is possible to prevent corrosion.

The above and other objects and features of the present invention will become apparent from the following descriptions of preferred embodiments taking reference to the accompanying drawings, in which:

FIG. 1 is a perspective view of an automobile having a windshield moulding structure to which the present invention can be applied;

FIG. 2 is a fragmentary sectional view taken along the line II—II in FIG. 1;

FIG. 9 is a fragmentary sectional view showing the procedure of removing the moulding.

Figure 3:
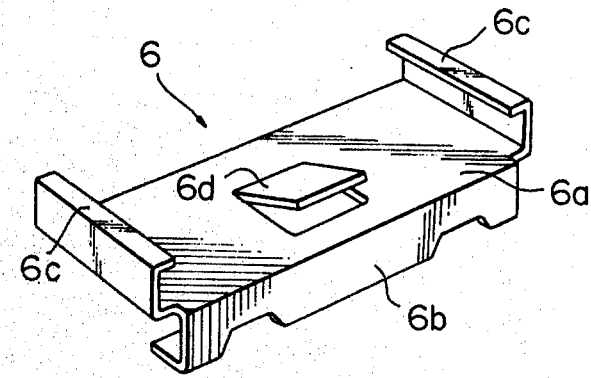
FIG. 3 is a perspective view showing the first clip member used in the structure shown in FIG. 2.
Figure 4:
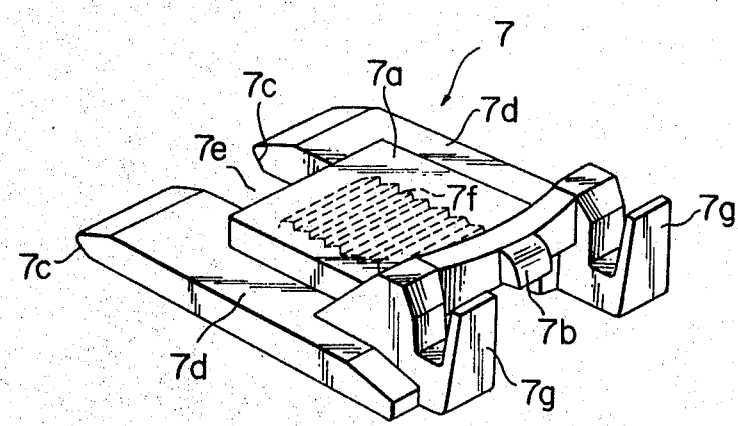
FIG. 4 is a perspective view of the second clip member.
Figure 5:
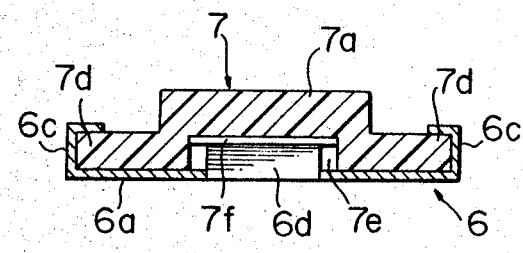
FIG. 5 is a cross-sectional view of the clip device comprised of the first and second clip members.

Referring now to the drawings, particularly to FIG. 1, there is shown an automobile having a body frame 1, a windshield glass 2 and a moulding 3 installed along the peripheral edge portion of the glass 2. In FIG. 2, it will be noted that the body frame 1 is formed along the periphery of the windshield opening with a stepped portion comprised of a shoulder 1a and a marginal edge portion 1b. The windshield glass 2 is attached to the marginal edge portion 1b of the body frame 1 by means of an adhesive 4. As usual in the art, a dam 5 is provided between the glass and the marginal edge portion 1b of the body frame 1 for arresting the adhesive 4.

The moulding 3 is installed on the glass 2 by means of a moulding clip device which comprises a first clip member 6 and a second clip member 7. Referring to FIG. 3, it will be noted that the first clip member 6 is made of a sheet metal and includes a base 6a formed at its front edge with a rearwardly opening channel shaped gripping portion 6b which engages the edge portion of the windshield glass 2 as shown in FIG. 2. At the opposite sides of the base 6a, there are formed an opposed pair of channel shaped guide portions 6c. Further, the base 6a has a resilient retaining pawl 6d which is formed at the center portion of the base 6a so as to incline forwards and upwards.

The second clip member 7 which may be made of a plastic material comprises a body 7a formed at its front end with a pawl 7b and at its rear end with a pair of laterally spaced fingers 7c. As shown in FIG. 2, the pawl 7b and the fingers 7c engage the opposite side edges of the moulding 3 so as to hold it under the resiliency of the moulding 3. At the opposite sides of the body 7a, there are formed slide portions 7d which are adapted for slidable engagement with the guide portions 6c. Between the slide portions 7d and therefore beneath the body 7a, there is defined a longitudinally extending recess 7e and the body 7a is formed on the bottom surface with indentations 7f. The second clip member 7 is further formed with a pair of laterally spaced tongues 7g which are spaced forwardly from the pawl 7b so that the moulding 3 is received between the pawl 7b and the tongues 7g as shown in FIG. 2.

The first and second clip members 6 and 7 are assembled together by bringing the slide portions 7d of the second clip member 7 into slidable engagement with the guide portions 6c of the first clip member 6. In this instance, the retaining pawl 6d engages the indentations 7f so that the second clip member 7 is prevented from moving in one direction with respect to the first clip member 6 while the movement of the second clip member 7 in the opposite direction is permitted.

In use of the clip device described above, a suitable number of the first clip members 6 are at first attached to the windshield glass 2 at appropriately spaced positions by engaging the gripping portions 6b with the edge portion of the glass 2. Then, the second clip member 7 is mounted on each of the first clip members 6 by inserting the slide portions 7d into the guide portions 6c of the clip member 6. The moulding 3 is thereafter attached to the second clip members 7 by having the opposite side edges of the moulding engaged with the pawls 7b and the fingers 7c. The moulding 3 is then moved together with the second clip member 7 in the aforementioned opposite direction with respect to the first clip member 6 until the tongues 7g which are between the moulding 3 and the shoulder portion 1a of the body frame 1 are forced against the shoulder portion. The moulding 3 and the second clip member 7 are thus held in position by the resilient pawls 6d on the first clip member 6 engaging with the indentations 7f on the second clip member 7.

Figure 6:
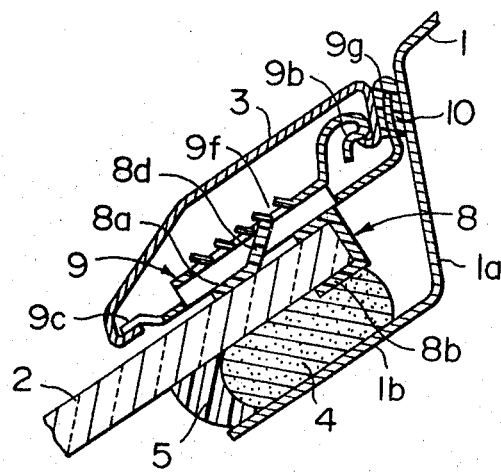
FIG. 6 is a fragmentary sectional view similar to FIG. 2 but showing another embodiment of the present invention.
Figure 7:
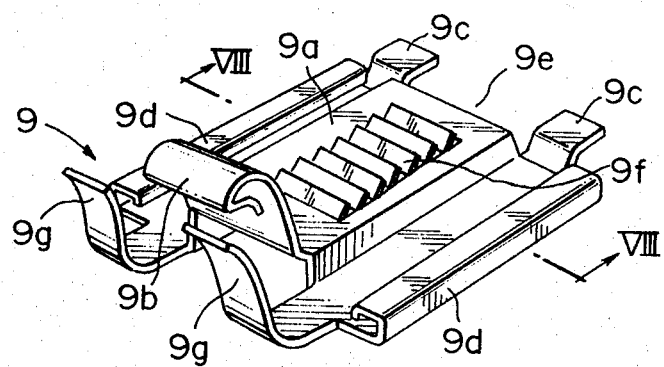
FIG. 7 is a perspective view of the second clip member used in the structure shown in FIG. 6.
Figure 8:
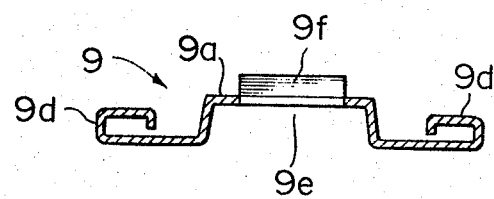
FIG. 8 is a sectional view taken along the line VIII—VIII in FIG. 7.

Referring now to FIGS. 6 through 8 which show a further embodiment of the present invention, the clip device comprises a first clip member 8 and a second clip member 9. The first clip member 8 is similar in configuration with the first clip member in the previous embodiment and may be made of a plastic material. Thus, the clip member 8 has a base 8a formed with a channel shaped gripping portion 8b at the front end thereof. Further, the base 8a of the first clip member 8 is provided at the central portion thereof with a retaining resilient pawl 8d. Although not shown in the drawings, the first clip member 8 has channel shaped guide portions at the opposite sides thereof as in the first clip member of the previous embodiment.

The second clip member 9 is made of a sheet metal and has a base 9a formed at its front end with a pawl 9b and at its rear end with a pair of fingers 9c for engagement with the moulding 3. At the opposite sides of the body 9a, there are formed a pair of slide portions 9d, and a pair of tongues 9g are formed at forwardly spaced portions with respect to the pawl 9b. It is preferable that the tongues are applied with resinous coatings. The body 9a of the second clip member 9 is further formed with indentations 9f. The clip device of this embodiment is used just the same as in the previous embodiment so that any further description will not be made.

The clip device in accordance with the present invention is further characterized by the fact that the second clip member can be readily removed from the first clip member. For example, in case of the clip device in accordance with the first embodiment, the moulding 3 is resiliently deformed at the edge opposite to the shoulder 1a of the body frame 1 to move the edge apart from the windshield glass and a suitable tool 11 is inserted into the recess 7e of the second clip member 7 to depress the pawl 6d to disengage it from the indentations 7f of the second clip member 7. The second clip member 7 is then moved with respect to the first clip member 6 until the former is totally removed from the latter.

The invention has thus been shown and described with reference to specific examples, however, it should be noted that the invention is in no way limited to the details of the illustrated structures but changes and modifications may be made without departing from the scope of the appended claims.

I claim:

1. In an automobile windshield structure comprising a windshield glass adhesively attached to a body frame at a windshield opening thereof, a clip device for installing a moulding along peripheral edge portion of the glass, said clip device comprises a first clip member having means for gripping the peripheral edge portion of the glass and guide channel means, and a second clip member having means for engaging the moulding and means for slidably engaging with said guide channel means in the first clip member, said first clip member being formed with resilient retaining means and said second clip member with indentation means engageable with said retaining means so as to constrain relative movement between the first and second clip members in one direction but allow relative movement in the opposite direction.

2. The clip device in accordance with claim 1 in which said resilient retaining means is in the form of at least one resilient pawl inclined obliquely with respect to a base of the first clip member having a free edge engageable with said indentation means, said pawl being deformable by applying an external force to lie substantially along the base to disengage the second clip member from the first clip member.

3. The clip device in accordance with claim 1 in which said first clip member includes a base and said guide channel means includes a pair of channel shaped guide portions formed at the opposite sides of the base, said second clip member including a body having the means for slidably engaging in the form of a pair of guide portions formed at the opposite sides of the body and adapted to be engaged with the guide portions in the first clip member.

4. The clip device in accordance with claim 1 in which at least one of the first and second clip members is made of a plastic material.

5. The clip device in accordance with claim 1 in which said second clip member has tongue means adapted to be placed between the moulding and the body frame so as to prevent direct contact between the moulding and the body frame.

6. The clip device in accordance with claim 5 in which said second clip member is made of a plastic material.

7. The clip device in accordance with claim 5 in which said second clip member is made of a metallic material and coated at least at the tongue means with resinous material.

8. In a windshield structure comprising a windshield glass adhesively attached to a body frame at a windshield opening thereof, a clip device for installing a moulding along peripheral edge portion of the glass, said clip device comprises first and second clip members, said first clip member including a base having a front end formed with a gripping portion for gripping engagement with the peripheral edge portion of the glass and opposite side edge portions formed with a pair of opposed guide channels, said base being formed at central portion thereof with resilient retaining pawl means inclined upwardly toward the front end thereof, said second clip member including a body having front and rear end portions formed with pawl means for engagement with the moulding and a pair of slide portions formed along the opposite sides of the body of the second clip members for engagement with the guide channels in the first clip member, said body of the second clip member having a recess extending between the front and rear end portions at a surface facing to the first clip member, said surface of the body being formed with indentation means for engagement with the retaining pawl means in the first clip member.

9. The clip device in accordance with claim 8 in which said second clip member has tongue means which is forwardly spaced from the pawl means at the front end portion of the body so that the moulding is inserted between the pawl means and the tongue means.

* * * * *